(12) United States Patent
Lippens

(10) Patent No.: US 10,057,258 B2
(45) Date of Patent: Aug. 21, 2018

(54) BIOMETRIC IDENTIFICATION DEVICE

(71) Applicant: MORPHO, Issy-les-Moulineaux (FR)

(72) Inventor: Nicolas Lippens, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/744,647

(22) Filed: Jun. 19, 2015

(65) Prior Publication Data

US 2015/0373018 A1    Dec. 24, 2015

(30) Foreign Application Priority Data

Jun. 19, 2014   (FR) ...................... 14 55673

(51) Int. Cl.
| | |
|---|---|
| *G06K 9/03* | (2006.01) |
| *H04L 29/06* | (2006.01) |
| *H04L 9/32* | (2006.01) |
| *H04L 29/08* | (2006.01) |
| *G06K 9/00* | (2006.01) |
| *G07C 9/00* | (2006.01) |

(52) U.S. Cl.
CPC ...... *H04L 63/0861* (2013.01); *G06K 9/00087* (2013.01); *G06K 9/03* (2013.01); *G07C 9/00563* (2013.01); *H04L 9/3231* (2013.01); *H04L 67/02* (2013.01); *G07C 2209/02* (2013.01)

(58) Field of Classification Search
CPC .... H04L 63/0861; H04L 67/02; H04L 9/3231
See application file for complete search history.

(56) References Cited

U.S. PATENT DOCUMENTS

| | | | |
|---|---|---|---|
| 2005/0243199 A1* | 11/2005 | Bohaker | H04N 1/00127 348/373 |
| 2005/0275888 A1 | 12/2005 | Cannon et al. | |
| 2006/0110011 A1* | 5/2006 | Cohen | G06F 21/121 382/115 |
| 2014/0063055 A1 | 3/2014 | Osterhout et al. | |

* cited by examiner

*Primary Examiner* — Beemnet Dada
(74) *Attorney, Agent, or Firm* — Muncy, Geissler, Olds & Lowe, P.C.

(57) ABSTRACT

A biometric identification device comprising a computer unit (3) arranged to execute an identification program and a registration program for storing in memory both biometric characteristics and also identifiers of people to be identified subsequently. The device comprises means for exchanging data with a distinct computer terminal (100) provided with a screen, and the registration program comprises a web server programmed to co-operate with a web browser of the terminal to set up a bidirectional communication channel and to send in real time to the web browser, via the communication channel, information about capture progress in order to enable the information to be displayed on the terminal in the form of a capture web page.

11 Claims, 3 Drawing Sheets

BIOMETRIC IDENTIFICATION DEVICE

The present invention relates to biometric identification of individuals, e.g. for the purpose of controlling access to premises or to computer data.

An identification device generally comprises a capture unit for capturing biometric characteristics and a computer unit connected to the capture unit in order to control it so as to perform a biometric identification method.

The biometric identification method consists in capturing biometric characteristics of the person for identification and in comparing the captured biometric characteristics with biometric characteristics previously stored in a database.

Performing such a method thus requires a database to be built up that contains the biometric characteristics with which the biometric characteristics captured during identification are compared. The term "registration" is used to designate the operation that consists in capturing the biometric characteristics of an individual on a first occasion and in storing them in a database so as to be able subsequently to identify said individual. It can be understood that the quality of the biometric characteristics stored in the database determines the effectiveness of subsequent identification. For this purpose, registration is usually performed on a dedicated computer station, e.g. a computer of the personal computer (PC) type, having a screen and connected to a capture device, e.g. via a serial connection of the universal serial bus (USB) type, and it executes a registration program controlling the capture device by means of a driver program compatible with the operating system of the computer. The registration program exchanges data in real time with the capture device so as to be able to display on the screen information about capture progress. This information serves to guide the individual during registration about proper positioning (how to position one or more fingers on the capture device when identification is performed by means of fingerprints). By way of example, this information comprises information about how the individual should be positioned before beginning capture proper of biometric characteristics, information announcing the beginning of capture, information about capture progress, information announcing the end of capture, and information about the quality of the captured biometric characteristics. The registration program also displays a form for inputting at least one identifier for the individual to be registered, a page announcing that capture has succeeded or has failed, . . . .

Having recourse to a computer is not always practical nor even always possible, and there is a need to be able to perform registration directly with the identification device. Unfortunately, that can be envisaged only if the device has a screen that can be used for monitoring capture progress during the registration operation so as to be sure that capture is carried out under conditions that make the looked-for quality achievable. Adding such a screen nevertheless increases the cost and the size of the identification device.

In order to remedy those drawbacks, proposals have been made to enable the identification device to be connected to a communication terminal, such as a telephone of the smart phone type or a computer touch tablet, with the registration program being run on the terminal. Nevertheless, provision must be made for the registration program to be compatible with the wide variety of operating systems to be found in communication terminals or else it is necessary to provide several versions of the registration program. In addition, this assumes that the computer terminal can take control of the identification device, at least temporarily, which raises problems of security.

An object of the invention is to provide means for enabling a registration operation to be performed simply on an identification device.

To this end, the invention provides an identification device comprising a capture unit for capturing biometric characteristics and a computer unit connected to the capture unit in order to control it, the computer unit being arranged to execute an identification program and a registration program for storing in memory both biometric characteristics and also identifiers for of least one person who is to be identified subsequently. The device includes means for exchanging data with a distinct computer terminal provided with a screen and an input interface. The registration program comprises a web server programmed to co-operate with a web browser of the terminal to establish a bidirectional communication channel, and the registration program is arranged to act in real time by means of the capture unit to determine information about the progress of capture and to send in real time to the web browser, via the communication channel, the information about the progress of capture so that it can be displayed on the terminal in the form of a capture web page.

Thus, the identification device uses the screen of the computer terminal to display the information about capture progress. The input interface may for example be a standard alphanumeric keyboard, a numeric keypad, or a few buttons enabling contextual menus to be displayed and enabling selections to be made in those menus (it should be observed that if the screen is a touch screen, it may also be used as a keyboard for the identification device), a memory reader, . . . . With the invention, the web server transmits data to the web browser continuously and can thus update the information presented to the individual for registering in order to enable that individual to follow how capture is progressing. Preferably, the bidirectional communication channel uses a protocol in compliance with the RFC 6455 standard.

Other characteristics and advantages of the invention appear on reading the following description of particular, non-limiting embodiments of the invention.

Reference is made to the accompanying drawings, in which.

The invention is described herein in application to an identification device dedicated to controlling access to premises. The identification device is thus for mounting on an outside wall of the premises in question, in the vicinity of a door giving access thereto. Naturally, other applications for the identification device can nevertheless be envisaged.

The invention is described herein with reference to identification by recognizing fingerprints. Naturally, the invention can be used for biometric characteristics of any type.

Figure 1:
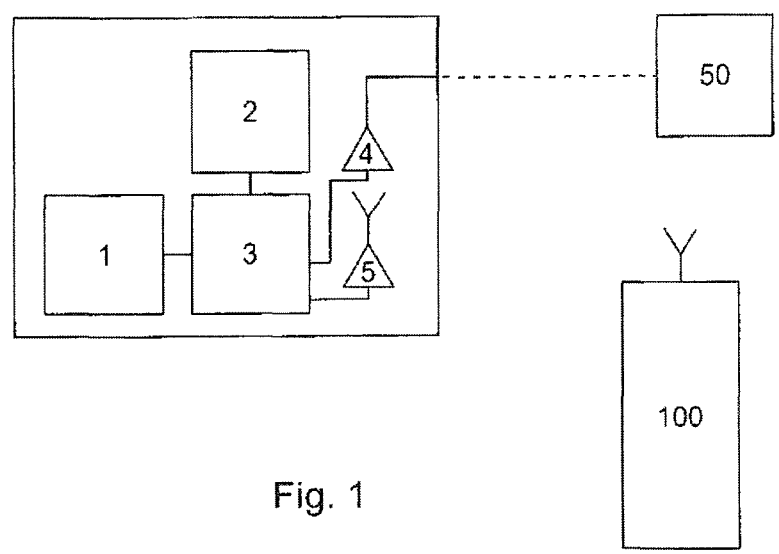
FIG. 1 is a diagram of an access authorization device in accordance with the invention.

With reference to FIG. 1, the identification device of the invention comprises:

a capture unit 1 for capturing biometric characteristics;
a locking unit 2 for locking the door; and
a computer unit 3 connected to the capture unit 1 and to the locking unit 2 in order to control them.

The capture unit 1 comprises an optical sensor of known type serving to capture images of one or more of the fingers of users in order to detect biometric characteristics therein by image processing.

The computer unit 3 comprises a computer circuit with a processor, a mass memory, a random access memory (RAM), connection means 4 for connection with a remote server 50, and wireless means 5 of the WiFi type. The mass memory contains an operating system, an identification program, and a registration program.

The operating system is itself known.

The identification program, which is itself known, is arranged to:
- control the capture module 1 for capturing a fingerprint image of one or more fingers applied against the sensor of the capture module 1 by a candidate for identification;
- extract biometric characteristics from the image;
- compare the captured biometric characteristics with biometric characteristics stored in a database recorded in the mass memory of the computer unit 3;
- refuse to unlock the door if the comparison is unsuccessful; and
- inform the remote server 50 that identification has succeeded if the comparison is successful, and then receive from the remote server 50 an instruction to unlock and control the locking module 2 in order to open the door.

The registration program is arranged to:
- control the capture module 1 so that it captures a fingerprint image of a candidate for registration;
- extract biometric characteristics from the image; and
- store the biometric characteristics and identifiers of the candidate for registration in the database.

According to the invention, the registration program comprises a web server programmed to set up a bidirectional communication channel via the wireless communication means 5 with a web browser of a distinct computer terminal 100. The distinct computer terminal 100 may, for example, be a smart phone, a computer tablet, or a laptop computer. The distinct computer terminal 100 is itself known and does not form part of the invention: it has a screen and a keyboard and it possesses a computer unit programmed to run a conventional web browser. The bidirectional and full duplex communication channel operates in application of a protocol compliant with the RFC 6455 standard (which standard is commonly referred to as "web socket"). In this protocol, the web browser sends a first connection request to the web server, which sets up a communication channel between the web server and the web browser and enables the web server to send data to the web browser without other authorization or requests from the browser.

The registration program is also arranged to act in real time by means of the capture unit 1 to determine information about the progress of capture and to send information in real time to the web browser via the communication channel about the progress of capture in order to enable such information to be displayed on the terminal 100 in the form of a capture web page. The information about the progress of capture comprises:
- an image produced by the capture unit;
- information about the candidate for registration changing position relative to the capture unit; and
- information about the quality of the capture.

The registration program is also arranged to send pages to the web browser that include fields to be completed.

Figure 2:
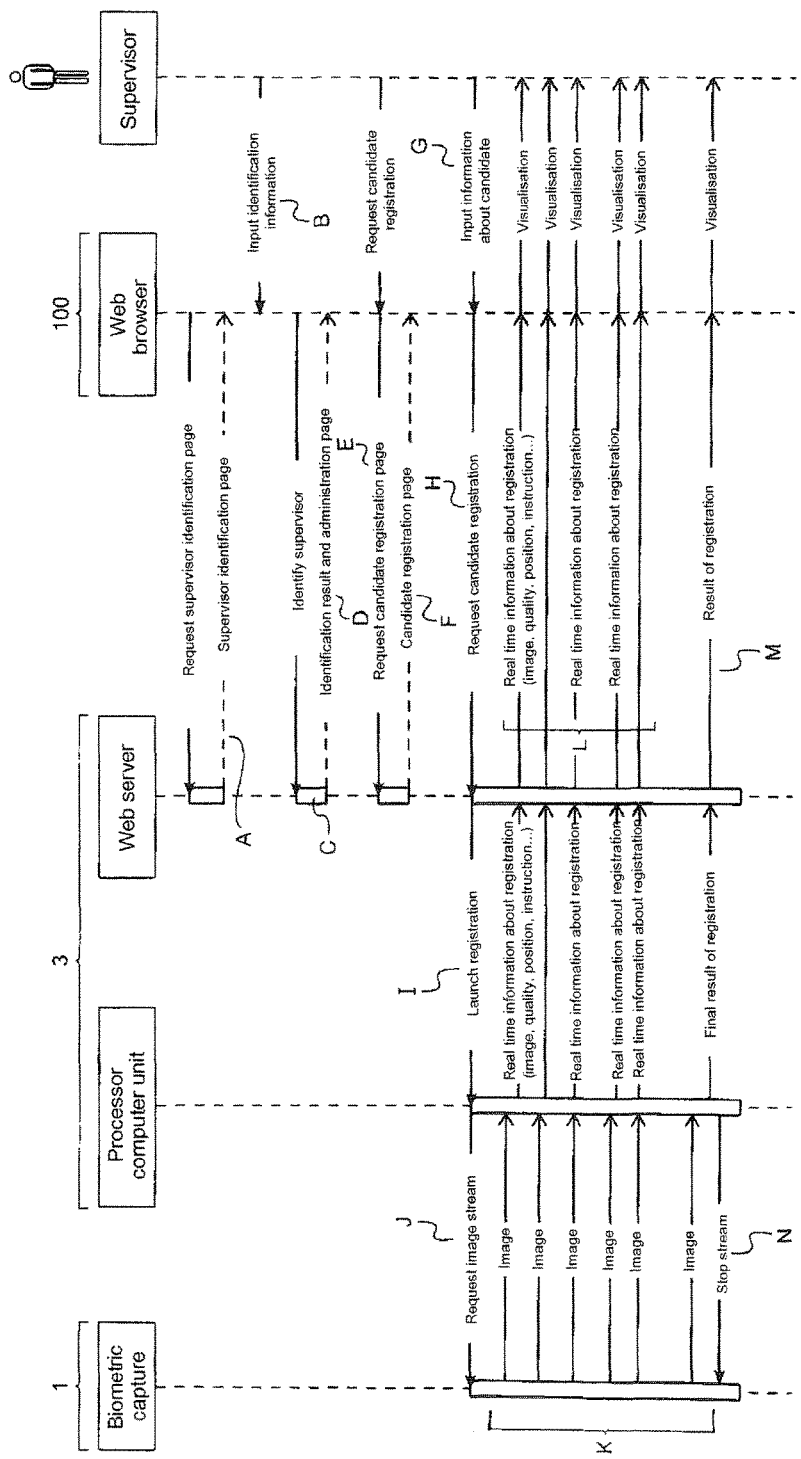
FIG. 2 is a diagram showing the data streams between the various components of the device in an embodiment of the device.

Thus, in operation and with reference to FIG. 2, once the web browser has sent a connection request to the web server, the registration program is arranged to:
- initiate the beginning of the registration procedure by sending to the web browser a page for identifying a registration supervisor (step A). This identification page has a field that is to be completed with identification information comprising an identifier of the supervisor and an access code (step B);
- make continuation of the registration procedure dependent on successful verification of the content of the field that has been completed (step C);
- send to the web browser (step D) a selection page enabling the supervisor either to begin a registration procedure or else to perform a parameter-setting action or some other action (since it is only the registration procedure that is of interest at this point, the supervisor decides to begin such a procedure in step E during which a registration page request is sent to the web server);
- send to the web browser (step F) an identification page for a registration candidate (or registration page) including a field that is to be completed with an identifier of the registration candidate, the periods during which candidate is authorized to access the premises, . . . . The information is input by the supervisor during step G and the registration request is sent to the web server (step H);
- launch registration (step I) and send a request for an image stream to the sensor (step J); the images are then sent periodically by the sensor to the computer unit 3 (steps K); and
- send to the web browser (step L) a capture page including information about the actions to be performed by the registration candidate in order to complete capture and in order to associate the identifier with the captured biometric characteristics.

The capture page includes a display zone for displaying the field facing the sensor. The web server periodically sends to the web browser data for displaying in this zone, together with repositioning information. This data and this information are extracted from the data sent by the capture module 1 to the computer unit 3.

The registration program is arranged to evaluate the quality of a captured image and to restart capture if the quality of the image is below a threshold. If the quality of the image is sufficient, the web server sends to the web browser (step M) a page announcing the end of the registration procedure (in a step N, it then also requests the capture module 1 to stop sending the stream of images), and it gives the supervisor the option of selecting another registration or of performing some other operation (parameter setting).

Preferably, the registration program has a plurality of sets of parameters for sending information about progress during capture. The parameters may relate for example on the amount of information sent and on the periodicity with which it is sent. By way of example, a particular set of parameters for use is selected as a function:
- of the type of computer terminal; and/or
- of the type of web browser; and/or
- of a rate at which data can be exchanged with the web browser; . . . .

Figure 3:
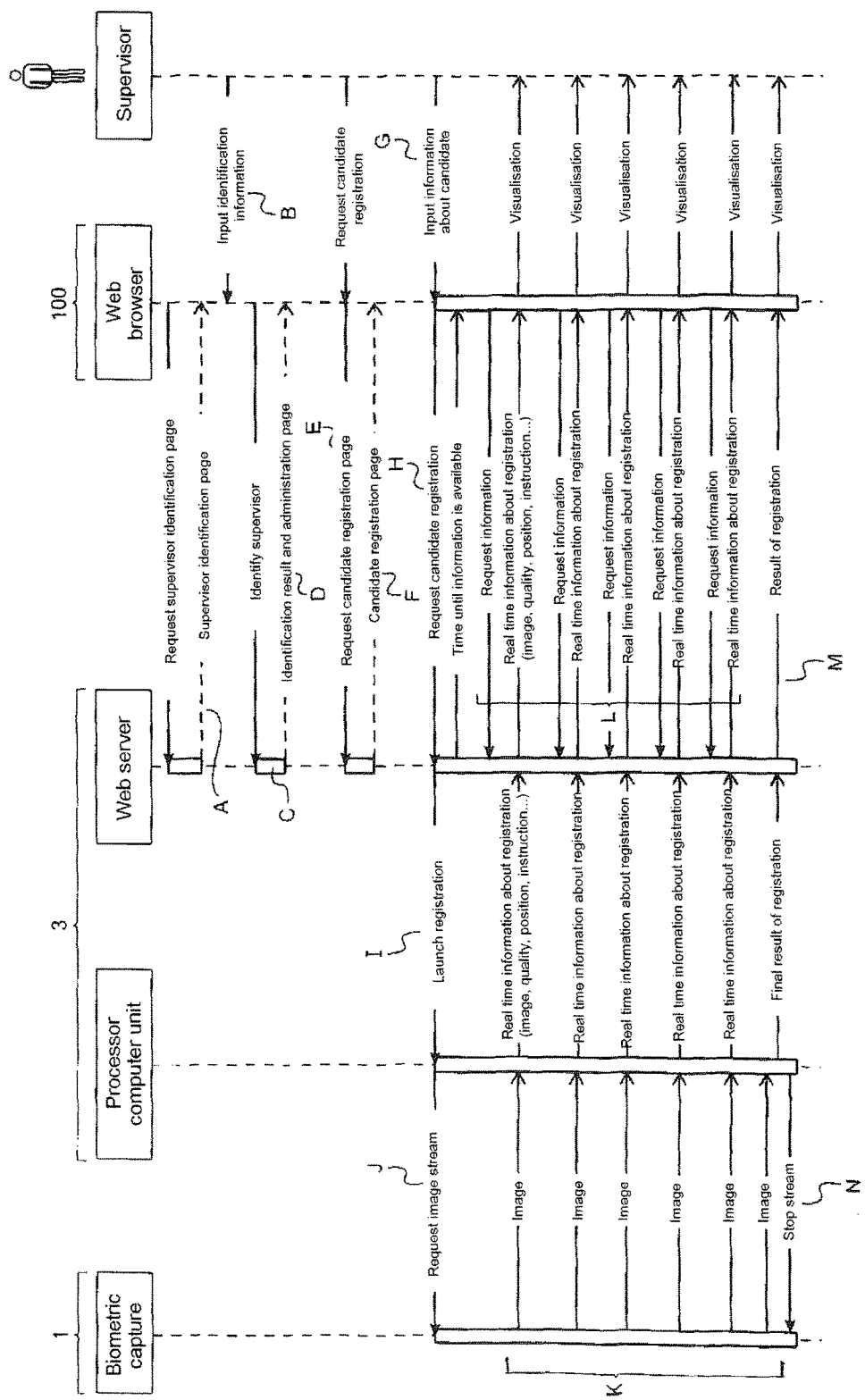
FIG. 3 is a diagram showing the data streams between the various components of the device in another embodiment of such a device.

FIG. 3 shows operation that makes use of real time polling, the web browser repeatedly interrogating the web server in order to obtain information for displaying concerning the progress of capture, and the web server providing, with each response following an interrogation from the web browser, the time that is to elapse before the following response. This makes it possible to limit the lag between display and capture.

Naturally, the invention is not limited to the embodiment described but covers any variant coming within the ambit of the invention as defined by the claims. In particular, the computer unit may control the locking unit directly or it may initiate an unlocking procedure to enable a remote server to control the locking unit directly or indirectly.

The term "access" should be considered broadly and, by way of example, it covers not only accessing premises such as a building, but also accessing computer files.

An access right may be total or partial (e.g. restricted to certain days or certain times).

The registration program may be a program launched specifically for registration purposes or it may form part of a program for overall management of the operation of the device.

The identification program may be a program that is launched specifically to perform identification, or it may be part of a program for overall management of the operation of the device.

The biometric database may be hosted in the remote server 50.

The identification device may include a unit for reading and writing a memory in a transportable medium, such as a magnetic card or an integrated circuit card. Thus, the biometric characteristics captured during registration may be stored in the memory of the card and not in a database stored in the identification device. During identification, the candidate then needs to present the card and press one or more fingers against the biometric sensor.

In a variant, communication between the web server and the browser may operate using a polling type protocol. The web browser regularly requests the web server whether information is available, and if so, the web server transfers the information to the web browser, which displays it on the computer terminal 100.

The time between two requests may be set in advance (when the web server supplies the page to the web browser, the page contains the time period to use), or it may be modified during registration (when the web server provides new information for display in the web browser, it may take advantage of that to inform the browser of the time period before new information is to be made available). The web browser then waits for that time period before making a new request. When using polling, the time between data being made available by the web server and that data being recovered by the web browser needs to be sufficiently short for the procedure to be referred to as a "real time" procedure (the user must not perceive any significant lag between what is happening on the sensor and what is displayed on the browser).

The invention claimed is:

1. An identification device, comprising:
    a capture unit for capturing biometric characteristics;
    a computer unit connected to the capture unit in order to control it, the computer unit being arranged to execute an identification program and a registration program for storing in memory both biometric characteristics and also identifiers of at least one person who is to be identified subsequently; and
    means for exchanging data with a distinct computer terminal provided with a screen and an input interface,
    wherein the registration program comprises a web server programmed to co-operate with a web browser of the terminal to establish a bidirectional communication channel, and
    wherein the registration program is arranged to act in real time by means of the capture unit to determine information about the progress of capture from images of an image stream captured and sent by the capture unit and to send in real time to the web browser, via the communication channel, the information about the progress of capture so that it can be displayed on the terminal in the form of a capture web page.

2. A device according to claim 1, wherein the bidirectional communication channel is a full duplex channel.

3. A device according to claim 2, wherein the bidirectional communication channel uses a protocol in compliance with the RFC 6455 standard.

4. A device according to claim 1, wherein the registration program is arranged to send to the web browser an identification page for identifying a registration supervisor, which page includes at least one field that is to be completed, and to make continuation of registration dependent on successful verification of the content of the completed field.

5. A device according to claim 1, wherein the registration program is arranged to send to the web browser an identification page for a candidate for registration including at least one field that is to be completed with an identifier of the candidate for registration and to associate that identifier with the captured biometric characteristics.

6. A device according to claim 1, wherein the information about capture progress includes an image produced by the capture unit.

7. A device according to claim 1, wherein the information about capture progress includes information about repositioning the candidate for registration relative to the capture unit.

8. A device according to claim 1, wherein the information about capture progress includes information about the quality of the capture.

9. A device according to claim 1, wherein the registration program is arranged to evaluate the quality of the captured image and to restart capture if the quality of the image is below a threshold.

10. A device according to claim 1, wherein the registration program has a plurality of parameter settings for sending information about capture progress as a function of the type of computer terminal, of the type of web browser or of a rate at which data is to be exchanged with the web browser.

11. An access authorization device including a locking device for locking access and an identification device in accordance with any preceding claim and connected to the locking device in order to control it.

\* \* \* \* \*